April 8, 1947. R. E. BRESSLER 2,418,540
SCREW CONVEYOR CONSTRUCTION
Filed Jan. 25, 1945
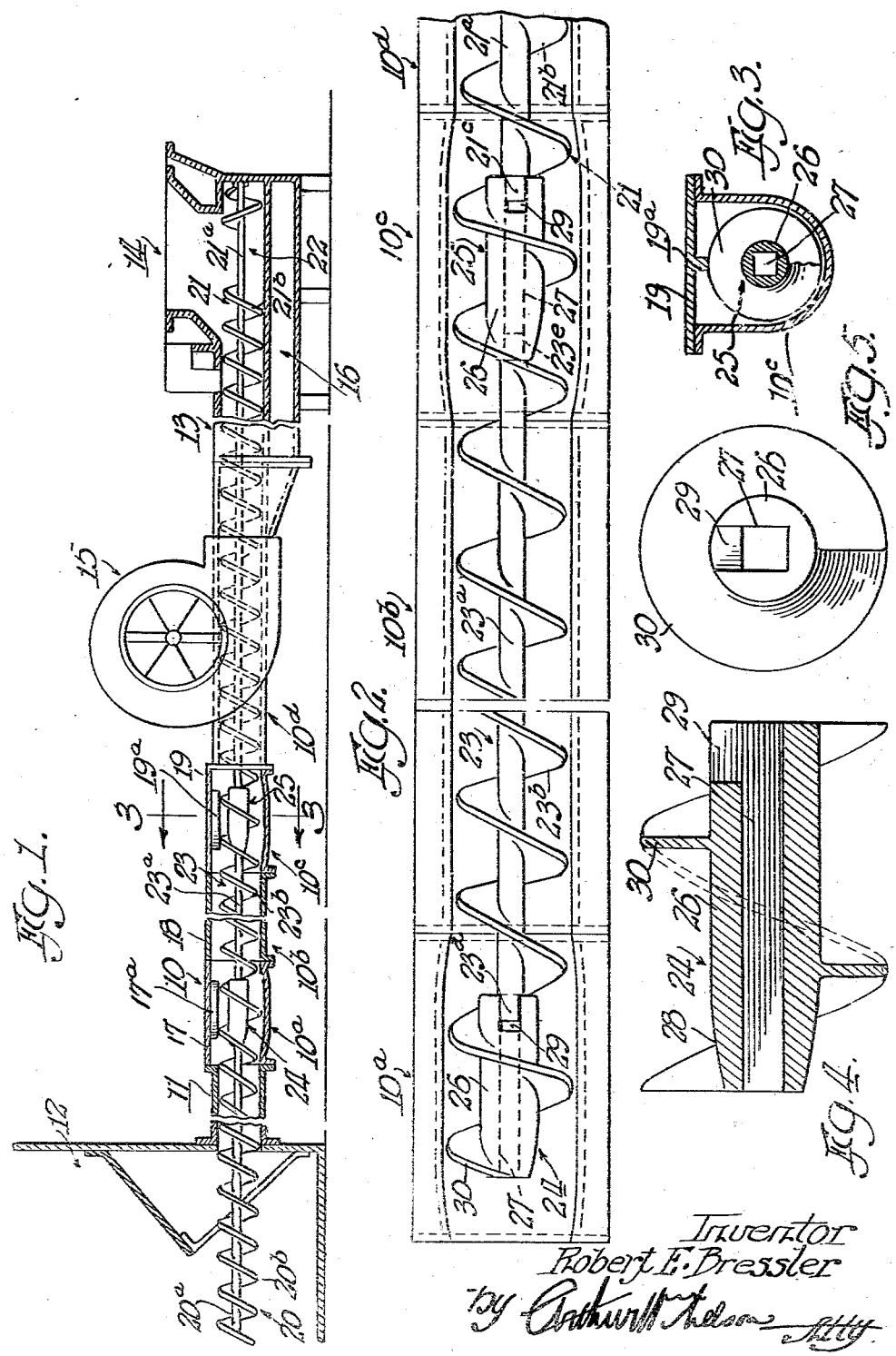
Inventor
Robert E. Bressler Patented Apr. 8, 1947

2,418,540

UNITED STATES PATENT OFFICE 2,418,540

SCREW CONVEYOR CONSTRUCTION

Robert E. Bressler, Oregon, Ill.

Application January 25, 1945, Serial No. 574,519

7 Claims. (Cl. 198—213)

This invention relates to improvements in screw conveyor constructions and it consists of the matters hereinafter described and more particularly pointed out in the appended claims.

The invention is more especially concerned with screw conveyor constructions of a considerable length or run and wherein the screw is made up of end to end arranged and coupled together sections having a driving connection with each other. Sectional conveyor screws of this kind are used in bin fed stokers where there is a considerable distance between the bin and the stoker, and wherein the stoker must be disposed near an upright building wall which makes it difficult to install the screw in the fuel feed duct. A sectional screw construction of this kind has advantages over a correspondingly long screw not only in initial cost but also in the cost of installation and servicing. In sectional screw conveyor constructions as heretofore used, such sections usually had a longitudinal recess in one end to receive the complemental end of an adjacent section for a driving coupled connection. However, such sections required that the sections be longitudinally separated completely for connection or disconnection, and this requires extra space or room. Often the matter of space or room is quite important in installing stokers in close quarters where the stoker site is limited by the surrounding walls and other objects.

Heretofore the coupling between the sections was the weakest part of the construction, due to limitations imposed by adjacent parts of the duct in which the construction was employed. For instance, the diametral size of the coupling was limited and if such size were increased to give the desired strength at this point, said size restricted the duct so that a choking of fuel occurred back of the coupling. When such couplings were made smaller in such diametral size so as to avoid the restricting and choking action, the coupling produced the weakest place in the construction so that added breakage occurred and additional servicing was necessary.

One of the objects of the present invention is to provide a sectional screw conveyor construction wherein at least one end of certain sections may be coupled to and removed from the associated end of an adjacent section by a relative lateral movement therebetween.

Another object of the invention is to provide a construction of this kind wherein the coupling between the sections, which is as strong, if not stronger than the sections themselves, requires but little movement to bring the parts thereof into coupled relation.

A further object of the invention is to provide, in a construction of this kind, a coupling and duct so formed as to avoid choking action back of the coupling.

Still another object of the invention is to provide a conveyor construction which is strong and simple in the arrangement of the parts thereof, as well as efficient in operation and which does not increase the cost to any appreciable extent.

The above mentioned objects of the invention, as well as others, together with the advantages thereof will more fully appear as the specification proceeds.

In the drawings:

Fig. 1 is a longitudinal vertical sectional view through a screw conveyor construction embodying the preferred form of the invention, as when employed in connection with a stoker for feeding coal thereto from a bin or the like.

Fig. 2 is a top plan view on an enlarged scale of a part of the duct and conveyor appearing in Fig. 1, with the cover plate removed, better to illustrate the parts involved.

Fig. 3 is a transverse vertical sectional view through a part of the improved conveyor construction, as taken on the line 3—3 of Fig. 1 and on a scale somewhat enlarged thereover.

Fig. 4 is a longitudinal vertical sectional view through one of the coupling sections of the conveyor screw on a scale enlarged over that of Fig. 2.

Fig. 5 is a view in end elevation of the coupling section appearing in Fig. 4.

Referring now in detail to that embodiment of the invention illustrated in the drawings, 10 indicates as a whole a duct disposed between a duct section 11 extending from the front wall of a coal bin 12 and the duct section 13 of an underfeed stoker 14. Said duct 10 as shown is constituted by a plurality of duct sections 10a—10b—10c and 10d, respectively, the sections 10a and 10c being hereinafter referred to as the "coupling" sections. The blower providing the air to support combustion of the fuel in the retort of the stoker is indicated at 15 and is disposed along one side of the duct section 10d. This blower, which is driven in any suitable manner, has its discharge end connected to a chamber or windbox 16 associated in operative relation with the retort of the stoker, as is usual in underfeed stokers of this kind.

The duct section 10d is of a tubular cross section, while the duct sections 10a—10b and 10c are each of an open top, trough-like cross section. As best appears in Figs. 2 and 4 the top portions of the side walls of the duct sections 10a—10b and 10c are made as lateral flanges and the lateral margins of associated flat cover plates 17, 18 and 19 have a bolted or screwed on detachable engagement therewith.

A screw conveyor 20, which includes the usual shaft 20a and flight 20b is disposed in the bin 12 and a part thereof extends through the section 11 into the section 10a. The other end of the screw conveyor 20 is operatively driven in any suitable manner by means not appearing herein. A second screw conveyor 21, which also includes a shaft 21a and a flight 21b is disposed in the duct 10d and one end thereof extends into the coupling duct section 10c while the other end thereof extends into the bottom of the retort 22 of the stoker 14.

In the duct section 10b, which may be of a considerable length, is located a third screw conveyor section 23, which also includes the usual shaft 23a and flight 23b, the ends of the shaft extending into the adjacent ends of the coupling sections 10a and 10c respectively. The flights of the conveyors 20—21 and 23 respectively are all of substantially the same diameter as are the shafts of said conveyors and which shafts include end parts of squared cross section.

In Fig. 2 I have shown the shaft 23a of the screw conveyor 23 as having squared ends 23d and 23e respectively and the shaft 21a of the screw conveyor 21 as having at least one squared end 21c on that end associated with the coupling duct section 10c.

The coupling duct sections 10a and 10c are relatively short in length and in each section is a screw conveyor coupling section 24 and 25 respectively. As both the duct sections 10a and 10c, as well as both the screw conveyor coupling sections are alike, a detailed description of one will suffice for both.

As best shown in Figs. 4 and 5, each screw conveyor coupling section 24—25 includes a hollow shaft part 26 having a longitudinal axial bore 27 of a square cross section complemental to the cross section of the squared ends of the shafts 20a—21a and 23a respectively. The shaft part 26 is of a diameter somewhat greater than that of the shafts just above mentioned and one end of said shaft part 26 is tapered as shown at 28 in Fig. 4. The bore 27 of said shaft not only opens endwise through the other end of said shaft but also laterally thereof, as at 29. On said shaft part 26 is a flight 30 which is of a greater diameter at its mid portion than it is at its end portions where the diameter thereof blends into the diameter of the flights of the conveyor sections 20, 21 and 23 respectively. To take care of the difference in diameter of the flight, the mid portions of the coupling duct sections are increased in transverse dimension and taper off toward the ends to match up with the ends of the duct sections 11, 10b and 10d before mentioned.

The increase in flight diameter for the conveyor sections 24—25 as well as the increase in transverse dimensions for the mid portions of the duct sections 10a and 10c is sufficient to feed the same amount of material as the flight of the conveyor sections 20—21 and 23. Thus the volume of material fed by the screw conveyor sections along the duct 10 as a whole is substantially uniform, so that piling up or choking of material at or back of the coupling sections is prevented.

In the assembly of the coupling sections, assume that the screw conveyor sections 20—21 and 23 have been positioned in their respective duct sections 11, 13 and 10b respectively. Also, assume that the cover plates 17 and 19 are off their respective duct sections. A screw conveyor coupling 24 is then inserted into the duct section 10a, tapered end first and with the recess 29 in its other end facing downwardly. Said tapered end of said coupling section is inserted over the squared end of the shaft 20a of the screw conveyor section 20, after which the other end of said section 24 is lowered so that the recess 29 faces downwardly to permit the passage of the squared end 23d of the shaft 23a of the conveyor section 23 through said recess to line up with the bore 27. The coupling section 25 is then applied or assembled with the shaft sections 23a and 21a respectively in similar manner so that the shafts are coupled together to be driven the one from the other by means of the screw conveyor section 20.

After the parts have been assembled as described, the cover plates 17, 18 and 19 are applied. On the underside of each plate 17 and 19 respectively is a longitudinal rib 17a and 19a respectively (see Figs. 1 and 3) which engage the mid portion of the flights 30—30 of the respective coupling sections and hold them down in position against such upward movement that said sections may tend to take under the action of the fuel moved along the duct 10 as a whole. Thus, there can be no disengagement between the sections even though parts of the bores 27 in the shafts of the screw conveyor coupling section are open at one side of one end thereof, as before described.

With the arrangement described, it is possible easily to assemble the screw conveyor sections in relatively close quarters because of the lateral movement connection between the coupling sections and the other sections of the screw conveyor. Also, the coupling connections between said sections are as strong, if not stronger than the other sections of the screw conveyor, so that the possibility of breakage at the couplings of the shafts is avoided.

Furthermore, clogging of the material being fed cannot occur back of the couplings.

While in describing the invention I have referred in detail to the form, arrangement and construction of the parts involved, the same is to be considered only in the illustrative sense so that I do not wish to be limited thereto except as may be specifically set forth in the appended claims.

I claim as my invention:

1. A screw conveyor construction embodying therein, longitudinally spaced conveyor sections, an open top trough-like coupling section between and operatively connected at its ends to adjacent ends of said conveyor sections, a shaft with a flight thereon in each conveyor section, each shaft having an end part with opposed flat sides extending into the associated end of the coupling section, a shaft with a flight thereon of such length as to be positioned in said coupling section through the open top thereof, said last named shaft being formed internally at one end with a part providing opposed flat faces for endwise application to the opposed flat sides of the end part of the shaft in one of said conveyor sections and providing a driving connection therewith and said shaft also being formed at the other end with opposed flat faces which open through one side and the extremity of said other end for lateral application to and removal from the opposed flat sides of the end part of the shaft in the other conveyor section and providing a driving connection therewith, and means for closing the open top of the coupling section and including a part that so engages the flight therein as to hold the shaft in said coupling section in operative driving relation with the shafts in the conveyor sections.

2. A screw conveyor construction embodying therein, longitudinally spaced conveyor sections, an open top trough-like coupling section between and operatively connected at its ends to adjacent ends of said conveyor sections, a shaft with a flight thereon in each conveyor section, each shaft having a squared shank at one end extending into the associated end of the coupling section, a shaft with a flight thereon of such length as to be positioned in said coupling section through the open top thereof, said last named shaft being formed with an internally squared part at one end for endwise application to the squared shank of the shaft in one of said conveyor sections and providing a driving connection therewith, and said shaft also being formed at the other end with an internally formed part that opens through one side and the extremity of said other end for lateral application to and removal from the squared shank on the end of said shaft in the other conveyor section and providing a driving connection therewith, and means for closing the open top of the coupling section and including a part that so engages the flight thereon as to hold the shaft in said coupling section in operative driving relation with the shafts in the conveyor sections.

3. A screw conveyor construction embodying therein, longitudinally spaced conveyor sections, an open top trough-like coupling section between and operatively connected at its ends to adjacent ends of said conveyor sections, a shaft with a flight thereon in each conveyor section, each shaft having a squared shank at one end extending into the associated end of the coupling section, a shaft with a flight thereon of such length as to be positioned in said coupling section through the open top thereof, said last named shaft having a squared bore extending longitudinally thereof and which at one end opens as a recess through one side thereof, said last named shaft being insertable into the coupling section through the open top thereof so that the other end of said bore may be applied longitudinally to the squared shank on the shaft in one of the conveyor sections and then have its other end applied laterally to the squared shank of the shaft in the other conveyor section by causing said recess to straddle opposed sides of said last named shank and thereby providing a driving connection between said shaft in the coupling section with the shafts in the conveyor sections, and means for closing the open top of said coupling section and including a part that so engages the flight therein as to hold the shaft in the coupling section in operative driving relation with the shafts in the conveyor sections.

4. A screw conveyor construction embodying therein longitudinally spaced conveyor sections, an open top trough-like coupling section between and operatively connected at its ends to the adjacent ends of said conveyor sections, said coupling section having the same inside diameter at its ends as said conveyor sections and having a greater inside diameter between its ends, a shaft with a flight thereon in each conveyor section, each last named shaft having an end part with opposed flat sides extending into the associated end of the coupling section, a shaft with a flight thereon of such length as to be positioned in said coupling section through the open top thereof, said last named shaft and the flight thereon each having a diameter greater than the shafts and the flights in said conveyor sections, the shaft in the coupling section being formed internally at one end with a part providing opposed flat sides for endwise application to the opposed flat sides of the end part of the shaft in one of said conveyor sections and providing a driving connection therewith and said shaft also being formed at the other end with opposed flat faces which open through one side and the extremity of said other end for lateral application to and removal from the opposed flat sides of the end part of the shaft in the other conveyor section and providing a driving connection therewith, and means for closing the open top of the coupling section and including a part that so engages the flight thereon as to hold said shaft in said coupling section in operative driving relation with the shafts in the conveyor sections.

5. A screw conveyor section embodying therein longitudinally spaced conveyor sections, an open top trough-like coupling section between and operatively connected at its ends to adjacent ends of the said conveyor sections, a shaft with a flight thereon in each conveyor section, each shaft having an end part with opposed flat sides extending into the associated end of the coupling section, a shaft with a flight thereon of such length as to be positioned in the coupling section through the open top thereof, said last named shaft being formed internally at one end with a part providing opposed flat sides for endwise application to the opposed flat sides of the end part of the shaft in one of said conveyor sections and providing a driving connection therewith and said last named shaft also being formed at the other end with opposed flat faces which open through one side and the extremity of said other end for lateral application to and removal from the opposed flat sides of the end part of the shaft in the other conveyor section and providing a driving connection therewith, a cover plate for closing the open top of the coupling section, and means providing a longitudinal rib on the underside of said cover plate that so engages the flight therein as to hold said shaft in said coupling section in operative driving relation with the shafts in said conveyor sections.

6. A coupling section for longitudinally spaced screw conveyor sections embodying therein a shaft and a helical flight thereon, said shaft having a longitudinal bore therein with end portions of rectangular cross sections at and opening through each extreme end of the shaft and there having opposed flat sides, and a recess opening laterally as well as longitudinally through one end of the shaft and having opposed flat faces that join the opposed flat sides of the bore in said end of the shaft.

7. A coupling section for longitudinally spaced screw conveyor sections embodying therein a shaft and a helical flight thereon, said shaft having at least at its ends, bore portions of rectangular cross section that open through the extremities of said ends and there have opposed flat sides, and a recess opening laterally as well as longitudinally through one of the ends of the shaft and having opposed flat faces that join the opposed flat sides of the bore portion in said one of said ends of the shaft.

ROBERT E. BRESSLER.

REFERENCES CITED

The following references are of record in the file of this patent:

UNITED STATES PATENTS

| Number | Name | Date |
|---|---|---|
| 1,938,565 | Anderson | Dec. 12, 1933 |
| 197,667 | Roberts | Nov. 27, 1877 |
| 534,507 | Hoagland | Feb. 19, 1895 |
| 895,765 | Jones | Aug. 11, 1908 |
| 2,058,125 | Bean | Oct. 20, 1936 |
| 2,292,934 | Fitch | Aug. 11, 1942 |
| 2,103,145 | Carter | Dec. 21, 1937 |